UNITED STATES PATENT OFFICE.

ROWLAND H. WOLFE, OF CHICAGO, ILLINOIS.

EGG BEATER.

1,409,209.  Specification of Letters Patent.  Patented Mar. 14, 1922.

Application filed July 28, 1919. Serial No. 313,830.

*To all whom it may concern:*

Be it known that I, ROWLAND H. WOLFE, a citizen of the United States, and a resident of the city of Chicago, county of Cook, and State of Illinois, have invented certain new and useful Improvements in Egg Beaters, of which the following is a specification.

My invention relates to new and useful improvements in egg beaters, and has for its object the provision of an egg beater which will be simple and durable in structure, economic in manufacture and efficient in use. Another object is the provision of an egg beater which is sanitary and permits of ready and thorough cleansing.

Other objects will appear hereinafter.

The invention consists in the combinations and arrangements of parts hereinafter described and claimed.

The invention will be best understood by reference to the accompanying drawings forming a part of this specification, and in which, Fig. 1 is a vertical sectional view of my invention.

Figure 1:
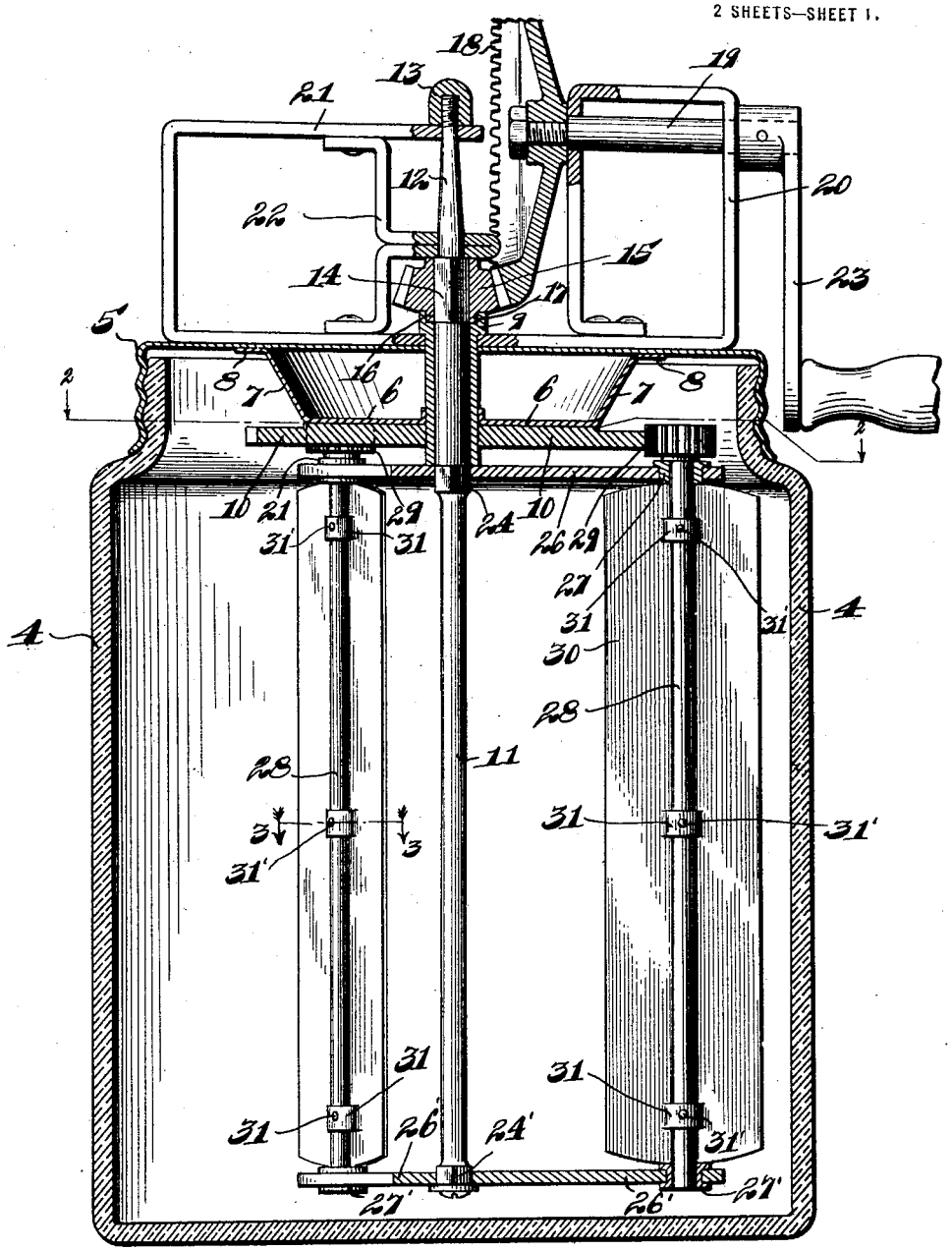
Figure 2:
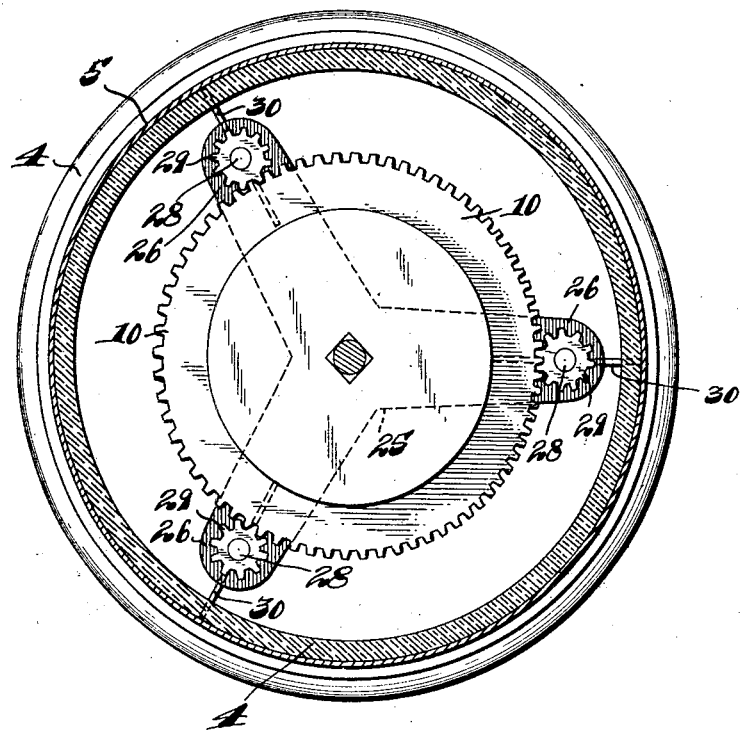
Fig. 2 is a longitudinal sectional view taken on substantially line 2—2 of Fig. 1.
Figure 3:
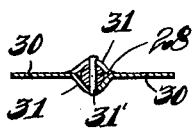
Fig. 3 is a sectional view taken on substantially line 3—3 of Fig. 1.

The approved form of construction comprises a receptacle 4. This receptacle 4 consists preferably of an ordinary fruit jar. A screw cap 5 is mounted upon the upper end of the receptacle 4 in the usual manner. Securely fastened on the under surface of the screw cap 5 is a cup-shaped disk 6 having an inclined wall 7, the upper end of the wall 7 being flanged, as at 8, to permit of the fastening of the same to the cap 5 by solder or other suitable means. In securing the cup-shaped disk to the cap 5, the connection between the under surface of the cap 5 and the flanged portion 8 must be close, and such as to exclude any liquid from entering therein. If this connection is not made close, particles of cream or egg may collect therein, and thus the sanitary feature of my invention would be destroyed. Projecting through the cap 5 in the center thereof, and also through the disk 6, is a tubular member 9 which is rigidly mounted relatively to the cap 5 and the cup-shaped disk 6. Rigidly mounted adjacent the lower end of the tubular member 9 is a gear-wheel 10, the upper surface of the wheel 10 being placed in close engagement with the lower surface of the disk 6. Projecting through the tubular member 9 is a shaft 11, the upper end of which is tapered, as at 12, the extreme upper end of the same being threaded and adapted to seat in a cap 13. The shaft 11 is squared at 14, whereon is rigidly mounted a bevel-gear 15, the lower hub 16 of the gear 15 resting in a slot 17 provided in the tubular member 9. Meshing with the gear-wheel 15 is a bevel-gear 18 rigidly mounted upon a shaft 19. This shaft 19 is mounted in bearings upon a suitable frame 20, which is mounted upon the upper surface of the cap 5. One end, 21, of the frame projects inwardly and forms a guide for the upper end of the shaft. An additional guide member 22 is rigidly mounted upon the frame, as shown in Fig. 1. Connected with the shaft 19 is a suitable crank 23 for the purpose of rotating the gear-wheel 18. The shaft 11 is also squared at 24, at which point there is mounted upon the shaft 11 an arm bearing member 25, radiating out from which are arms 26. Positioned in the arms 26, adjacent the outer end thereof, are suitable bushings 27, in which is rotatably mounted a shaft 28, to the upper end of which is secured a gear-wheel 29, which is adapted to mesh with the gear-wheel 10. The lower end of the shaft 11 is also squared, as at 24', whereon are secured suitable radiating arms 26', which bear at their extreme outer ends suitable bushings 27', adapted to receive the lower end of the shaft 28. Positioned upon the shaft 28, intermediate the radiating arms 26 and 26', are suitable paddles 30, said paddles being provided at intervals with lips 31, the lips 31 being adapted to engage the shaft 28 on one side, while the main body portion of the paddles engages the shaft on the opposite side. A suitable groove is provided in the paddles 30, in which the shaft 28 is adapted to lie, as clearly shown in Fig. 3. Suitable fastening means 31' project through the members 31 and rigidly mount the paddle 30 upon the shaft 28.

My invention is designed primarily for use as a cream whipper, egg beater or churn, and may be used for various other similar purposes. In operation, the material to be agitated is placed in the receptacle 4, whereupon the screw cap 5 is tightly fastened thereon. Upon the turning of the crank 23 through the operation of the gear wheels 18 and 15, the shaft 11 is caused to rotate, carrying with it the radiating arms. The gear-wheels 29 meshing with the stationary gear-wheel 10, are caused to rotate, thereby rotating the paddle members 30. In the structure which I have provided, it is unnecessary to ever remove the disk 6 from the screw cap 5, owing to the fact that none of the material which is used in the receptacle 4 can enter therein. In this structure, all of the parts which come into contact with the material contained in the receptacle, are so positioned as to afford easy access thereto, thus assuring complete and thorough cleansing of the same.

While I have illustrated and described the preferred form of construction for carrying my invention into effect, this is capable of variation and modification without departing from the spirit of the invention. I, therefore, do not wish to be limited to the precise details of the construction set forth, but desire to avail myself of such variations and modifications as come within the scope of the appended claims.

Having described my invention, what I claim as new and desire to secure by Letters Patent, is:—

1. In an egg beater, the combination of a central depending shaft; means for rotating said shaft; radially extending arms rigidly mounted on said shaft adjacent its upper end; radially extending arms rigidly mounted on said shaft adjacent its lower end; vertically extending shafts journalled adjacent the outer ends of said arms; paddles carried by each of said vertically extending shafts; and lips integrally formed on said paddles for the reception of said vertically extending shafts rigidly secured thereto, substantially as described.

2. In an egg beater, the combination of a central depending shaft; means for rotating said shaft; radially extending arms rigidly mounted on said shaft adjacent its upper end; radially extending arms rigidly mounted on said shaft adjacent its lower end; vertically extending shafts journalled adjacent the outer ends of said arms; paddles carried by each of said vertically extending shafts; and aligned fastening members buckled outwardly from said paddles for the reception of said vertically extending shafts rigidly secured thereto.

In testimony whereof I have signed my name to this specification in the presence of two subscribing witnesses.

ROWLAND H. WOLFE.

Witnesses:
JOSHUA R. H. POTTS,
JANET E. FARRELL.